C. G. KING.
BRACELET.
APPLICATION FILED DEC. 26, 1916.
1,264,810.
Patented Apr. 30, 1918.
3 SHEETS—SHEET 1.
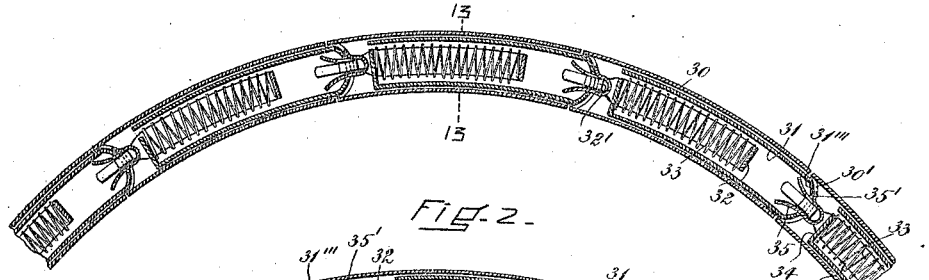
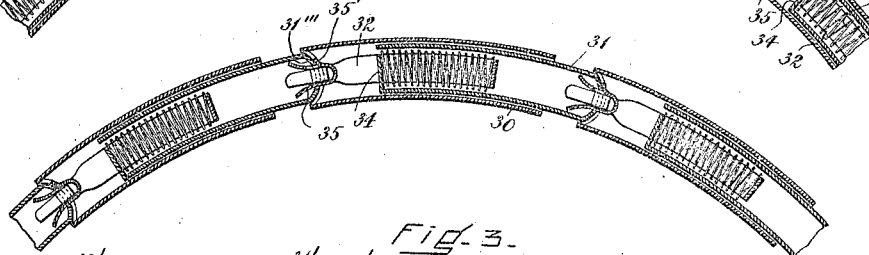
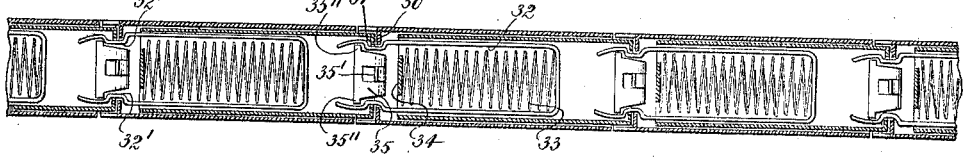
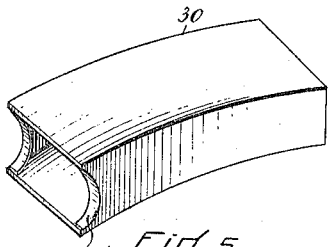
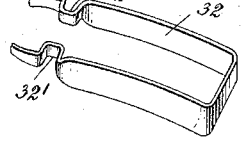
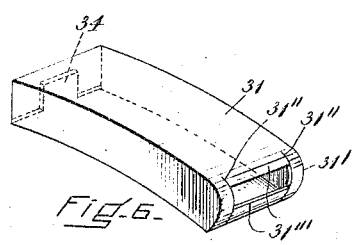
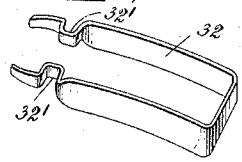
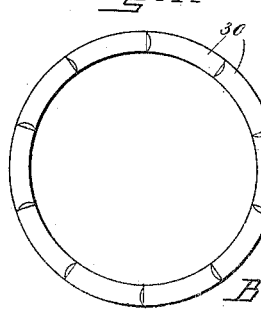
INVENTOR=
Clifford G. King
By Browne and Woodworth
HIS ATTORNEYS=

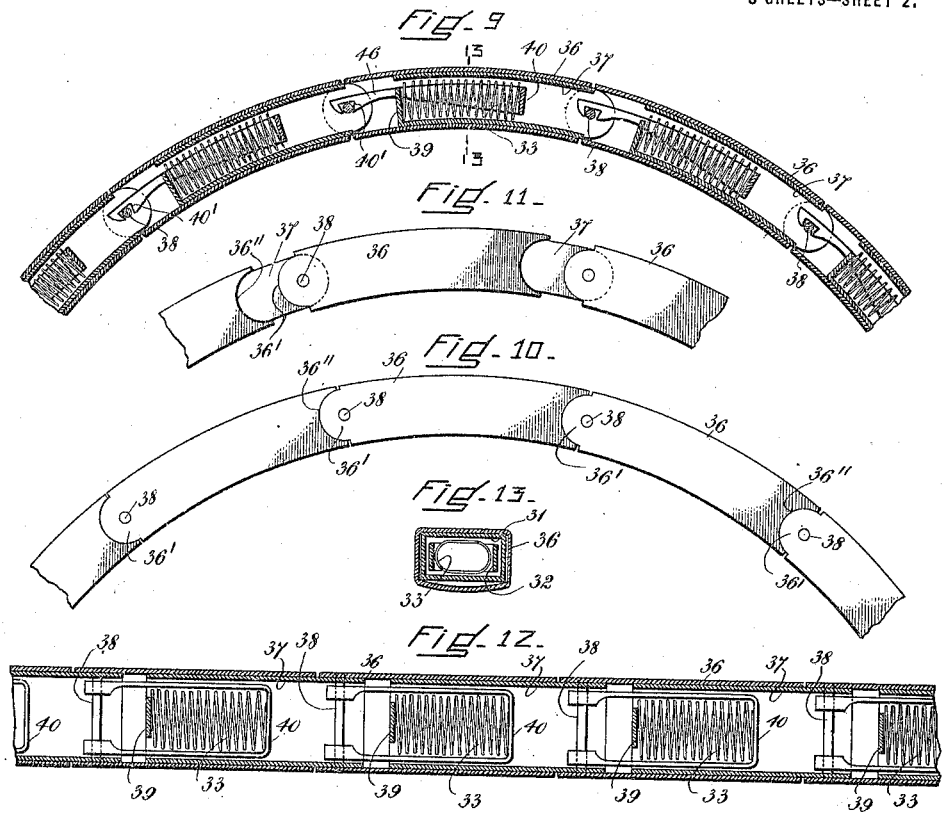
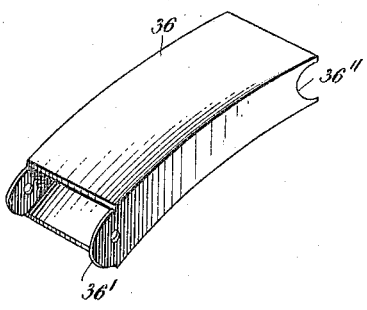
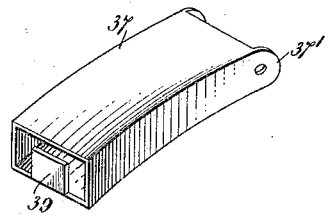
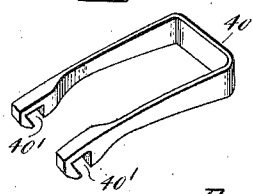

C. G. KING.
BRACELET.
APPLICATION FILED DEC. 26, 1916.
1,264,810.
Patented Apr. 30, 1918.
3 SHEETS—SHEET 3.
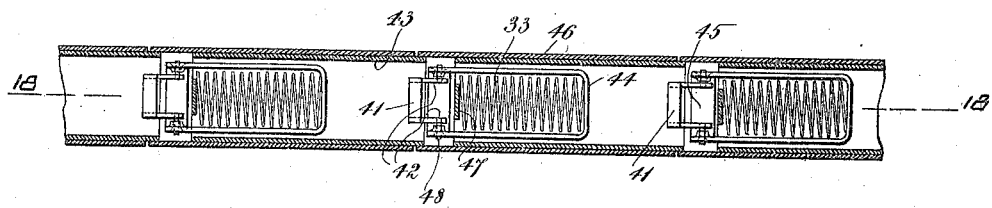
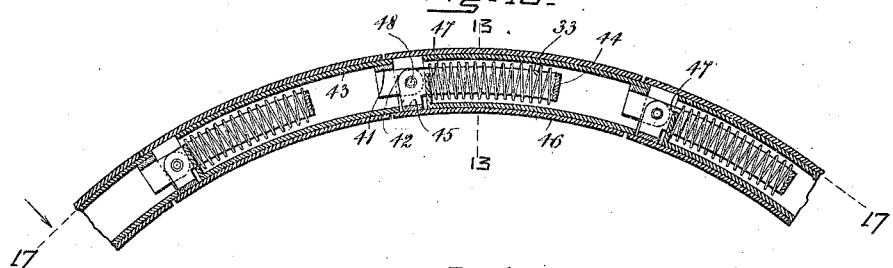
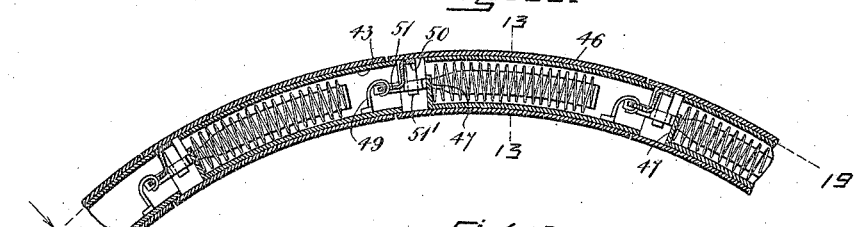
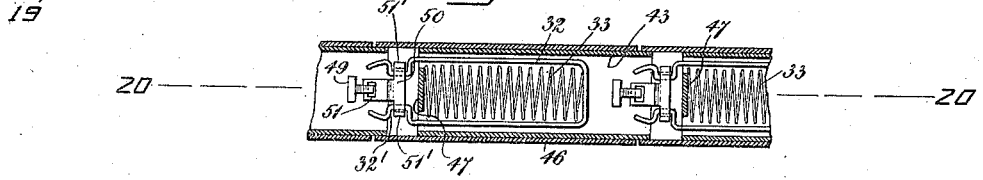
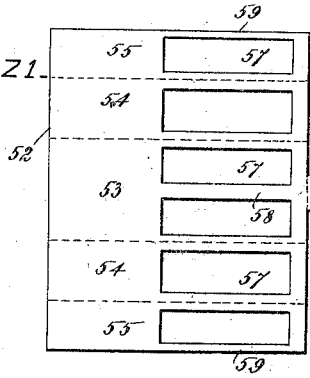
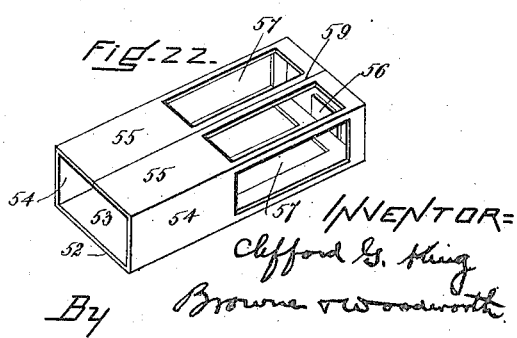
INVENTOR=
Clifford G. King
By Browne & Woodworth
HIS ATTORNEYS=

UNITED STATES PATENT OFFICE.

CLIFFORD G. KING, OF PROVIDENCE, RHODE ISLAND.

BRACELET.

1,264,810. Specification of Letters Patent. Patented Apr. 30, 1918.

Application filed December 26, 1916. Serial No. 138,867.

*To all whom it may concern:*

Be it known that I, CLIFFORD G. KING, a citizen of the United States, and a resident of Providence, in the county of Providence and State of Rhode Island, have invented a new and useful Improvement in Bracelets, of which the following is a specification.

My invention relates to bracelets, for example watch bracelets, of the expansible type and its object is to provide an article of this character which shall have firm and compact joints with a minimum of play or lost motion between the articulated members and at the same time be amply expansive and flexibly hinged with the smallest possible interruption to the smoothness and continuity of the exterior surfaces of said members as well as generally to improve and simplify the construction thereof in the manner hereinafter set forth.

Several embodiments of my invention are shown in the accompanying drawings in which—

Figure 1 is a vertical longitudinal section of my improved bracelet showing the parts in their normal position. Fig. 2 is a corresponding view showing the parts in extended position. Fig. 3 is a horizontal longitudinal section showing the parts in normal position. Fig. 4 is an elevation of the bracelet complete. Fig. 5 is a perspective view of one of the outer shell members. Fig. 6 is a perspective view of one of the inner tube members. Fig. 7 is a perspective view of one of the connecting members. Fig. 8 is a perspective view of a member, the function of which is to lock a connecting member in position. Fig. 9 is a vertical longitudinal section of another type of expansible bracelet embodying my invention. Fig. 10 is an elevation of the bracelet shown in Fig. 9 with the parts in normal position. Fig. 11 is a similar view showing the parts in extended position. Fig. 12 is a horizontal longitudinal section of the bracelet shown in Fig. 10. Fig. 13 is a vertical transverse section taken on the line 13—13 of Fig. 1, Fig. 9, Fig. 18 or Fig. 20. Fig. 14 is a perspective view of the outer shell of the bracelet shown in Fig. 10. Fig. 15 is a perspective view of the inner tube thereof. Fig. 16 is a perspective view of the connecting member employed in the modification of my invention shown in Fig. 10. Fig. 17 is a horizontal longitudinal section of another modification taken on the line 17—17 of Fig. 18. Fig. 18 is a vertical longitudinal section taken on the line 18—18 of Fig. 17. Fig. 19 is a horizontal longitudinal section taken on the line 19—19 of Fig. 20. Fig. 20 is a vertical longitudinal section taken on the line 20—20 of Fig. 19. Fig. 21 is a plan view of a blank from which the inner tube member may be constructed. Fig. 22 is a perspective view of an inner tube member folded up from the blank shown in Fig. 21.

In the particular drawings selected for more fully disclosing the several embodiments of my invention 30 represents an outer shell having the ends of the side walls at one end of the shell member bent inwardly and concaved at 30′ to form one of the members of a hinge joint arranged to receive the convexed coöperating end 31′ of an inner tube member 31, both ends of which are open. One end of the member 31 is slit as shown at 31″ and the upper and lower end surfaces of said member are bent downwardly and upwardly at 31‴ and the ends of the side walls are bent inwardly to afford a relatively large bearing surface adapted to coöperate with the concaved end of an outer shell.

A connecting member 32 consisting as shown of a clip of spring material terminating in oppositely curved end portions provided with recesses 32′ are employed for the purpose of securing an outer shell with its articulated tube member, said connecting member being inserted in the rear of a tube, a spring 33 being then slipped into position as shown in Fig. 3 and the lip 34 on the bottom of the tube being bent up to retain the spring in position between itself and the end of the connecting member. The projecting outer end of the connecting member is then forced through the hinge joint between a shell and its coöperating tube, the recesses 32′ engaging the end portions 30′, 31′. In order to lock the connecting member in position, a clip such as shown at 35 consisting in the present instance of a piece of spring metal bent on itself and having a lip 35″ struck up from one surface and flange members 35″, is forced between the ends of the connecting member, said lip 35′ being pushed beyond the downwardly curved portion 31‴ of the tube so that the locking member is retained securely in position, being prevented from moving backward by the lip 35′ and from moving forward by the flanges 35″.

As more clearly shown in Fig. 2 which represents the positions occupied by the parts when the bracelet is expanded, a tube is hingedly connected with a shell and the latter is yieldingly connected with the shell and tube to the right thereof. By means of the hinge connection a firm and compact and concealed joint between a shell and its coöperating tube is provided and there is practically no play or lost motion between the same.

In practice the bracelet will consist of about ten links or shells as shown in Fig. 4 and will have an internal diameter of about one and three-quarters inches. Where my invention is to be applied to a watch bracelet three links are removed and a watch secured to the end links in the usual well known manner.

As shown in Fig. 13 I prefer to make the lower surface of the shell members convex.

In the modification shown in Figs. 9 to 12 inclusive, the outer shell 36 is provided with convex hinge members 36' to which are secured the hinge members 37' of the tube 37 by means of the pintle 38, the convex end portion of each shell 36 taking into the concaved end 36 of the next adjacent shell. In this case the connecting members 40 between the end of which and the lip 39 of the tube a spring 33 is interposed, are provided with vertical recesses 40' which take over the pintle 38, said recesses preferably being tapered downwardly so that the end of the connecting member may be sprung over the pintle.

In the two modifications shown in Figs. 17, 18, and in Figs. 19, 20 respectively, the ends of the shells and links are square and hinge members are soldered to the upper and lower interior surfaces thereof.

In Figs. 17 and 18 the base 41 provided with vertically arranged ears 42 is soldered to the upper interior surface of the tube 43, and the connecting member 44 has its forward downwardly extending end 45 soldered to the lower interior surface of the shell 46 near the end thereof, a spring 33 being interposed as before between the end of the connecting member and a lip 47 extending up from one end of the inner tube. The ends of the connecting member are pivoted to the ears 42 as shown at 48.

In Figs. 19 and 20 a hook 49 is soldered to the lower interior surface of the tube 43 and the coöperating hinge member 50 provided with an aperture 51 for receiving the hook is soldered to the upper interior surface of the shell 46. The connecting member, which in this case will be the same as already described in connection with Fig. 1, engages the downwardly extending ears 51' which are integral with the member 50, the end of said connecting member being forced between said ears so that the recessed portions 32' thereof will snap over the same thereby securing the connecting member 32 firmly in place.

As will be obvious the means for connecting a shell with its coöperating tube are completely inclosed and hidden from view in all forms of my invention. Inasmuch as the rearward end of the tube is not exposed, a portion of the same may be cut away and thereby save a certain amount of stock. A convenient way of effecting this saving consists in folding up the tube from a blank 52 along the dotted lines, the portion 53 forming the base, 54, 54 the sides, and the two end portions 55, 55 the top. The lip 56 the function of which has already been explained will be bent up after the connecting member and spring have been inserted in the tube. About one-half of the stock is punched out of each section of the blank as shown at 57, 57 leaving on the base portion 53 the rib 58 between which and the rib formed by the portions 59 the connecting member and spring will be supported.

It will be obvious to those skilled in the art that various other modifications may be made without departing from my invention, the scope of which is defined by the appended claims.

I claim:

1. A bracelet, comprising in combination a series of tubes, a series of shells each embracing an open ended tube and hingedly connected with another open ended tube, and a yielding connection between each shell and the tube embraced thereby.

2. A bracelet, comprising in combination an open ended tube, a shell hingedly connected with said tube, an opened ended tube inclosed within said shell, and means yieldingly connecting said shell with the tube inclosed therein.

3. A bracelet, comprising in combination a tube having a curved end bearing-surface, a shell having a corresponding and oppositely curved end bearing-surface, means hingedly connecting said tube and shell, a tube inclosed within said shell, and a yielding connection between the last mentioned tube and said shell.

4. A bracelet, comprising in combination a tube, a shell, a connecting member engaging the juxtaposed ends of said tube and shell, and means for locking said connecting member in position.

5. A bracelet, comprising in combination a tube and a shell each having its walls at its juxtaposed ends bent inwardly, a connecting member in said shell engaging the inwardly bent ends of said tube and shell, a tube inclosed within said shell and inclosing said connecting member, and a yielding connection between said member and the last mentioned tube.

6. In a bracelet, a tube member folded up from a flat blank and having a relatively large portion of the stock cut away from one end of its base, top and side walls.

7. A bracelet, comprising in combination a series of tubes, a series of shells each inclosing a tube, a yielding connection between each shell and the tube inclosed therein, and means hingedly connecting one end of each shell with the tube inclosed within the adjacent shell, said means being inclosed within the bracelet.

8. An expansible bracelet, comprising in combination a series of tubes and shells, and means concealed within said bracelet for hingedly connecting each shell with its juxtaposed tube.

9. A bracelet, comprising in combination two members having their ends hingedly connected, a member engaging said ends, and resilient means coöperating with said member to exert pressure between said ends.

In testimony whereof, I have hereunto subscribed my name this 22nd day of December 1916.

CLIFFORD G. KING.

Copies of this patent may be obtained for five cents each, by addressing the "Commissioner of Patents Washington, D. C."